United States Patent
Eberhardt et al.

(10) Patent No.: US 11,203,050 B2
(45) Date of Patent: Dec. 21, 2021

(54) METHOD FOR PRODUCING A STEEL COMPONENT ASSEMBLY AND STEEL COMPONENT ASSEMBLY

(71) Applicant: Bayerische Motoren Werke Aktiengesellschaft, Munich (DE)

(72) Inventors: Florian Eberhardt, Schoellnach (DE); Christine Maria Kopp, Dingolfing (DE); Uwe Schmidt, Munich (DE); Josef Spoerer, Nandlstadt (DE); Siegfried Georg Zehentbauer, Geisenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 16/691,832

(22) Filed: Nov. 22, 2019

(65) Prior Publication Data
US 2020/0086374 A1 Mar. 19, 2020

Related U.S. Application Data

(63) Continuation of application No. PCT/EP2018/062744, filed on May 16, 2018.

(30) Foreign Application Priority Data

Jun. 28, 2017 (DE) ...................... 10 2017 210 864.9

(51) Int. Cl.
*B21D 39/03* (2006.01)
(52) U.S. Cl.
CPC ................................... *B21D 39/03* (2013.01)
(58) Field of Classification Search
CPC ........ B21D 39/03; B21D 39/06; B21D 28/24; F16B 11/006; F16B 25/0021; F16B 25/106; B21J 5/066; B21K 25/00; B62D 29/005
See application file for complete search history.

(56) References Cited

U.S. PATENT DOCUMENTS

| 9,296,923 B2 * | 3/2016 | Herzinger ............ B62D 29/005 |
| 2007/0048106 A1 | 3/2007 | Christ et al. |

(Continued)

FOREIGN PATENT DOCUMENTS

| CN | 1924376 A | 3/2007 |
| CN | 101590598 A | 12/2009 |

(Continued)

OTHER PUBLICATIONS

Chinese-language Office Action issued in Chinese Application No. 201880021810.1 dated Apr. 17, 2020 with English translation (eight (8) pages).
International Search Report (PCT/ISA/210) issued in PCT Application No. PCT/EP2018/062744 dated Aug. 3, 2018 with English translation (our (4) pages).

(Continued)

*Primary Examiner* — Lee A Holly
(74) *Attorney, Agent, or Firm* — Crowell & Moring LLP

(57) ABSTRACT

A method is provided for producing a steel component assembly, wherein a steel component having a predetermined breaking point is provided and the predetermined breaking point of the steel component is punched through by way of a press-fit element in order to form an opening. Subsequently, the press-fit element is pressed into the opening of the steel component, and, at least in overlap with the press-fit element, a component is adhesively bonded to the steel component by an adhesive applied over an area. A friction-drilling hole is melted through the press-fit element, the steel component and the component by way of a friction-drilling element.

6 Claims, 2 Drawing Sheets

(56) References Cited

U.S. PATENT DOCUMENTS

| | | |
|---|---|---|
| 2009/0294410 A1 | 12/2009 | Iwase et al. |
| 2011/0067478 A1 | 3/2011 | Babej |
| 2011/0211932 A1 | 9/2011 | Babej et al. |
| 2013/0273312 A1 | 10/2013 | Campbell et al. |
| 2015/0275944 A1 | 10/2015 | Duenisch et al. |
| 2017/0058934 A1* | 3/2017 | Haak .................... F16B 11/006 |
| 2017/0130751 A1 | 5/2017 | Norton et al. |
| 2017/0240989 A1 | 8/2017 | Becker et al. |

FOREIGN PATENT DOCUMENTS

| | | |
|---|---|---|
| CN | 102022413 A | 4/2011 |
| CN | 102003447 B | 8/2015 |
| CN | 106415030 A | 2/2017 |
| CN | 106969011 A | 7/2017 |
| DE | 10 2011 114 801 A1 | 5/2012 |
| DE | 10 2011 018 748 B3 | 7/2012 |
| DE | 10 2013 103 719 A1 | 6/2014 |
| DE | 10 2015 214 149 A1 | 2/2017 |
| JP | 2015-44228 A | 3/2015 |
| WO | WO 2016/096470 A1 | 6/2016 |

OTHER PUBLICATIONS

German-language Written Opinion (PCT/ISA/237) issued in PCT Application No. PCT/EP2018/062744 dated Aug. 3, 2018 (five (5) pages).

German-language Office Action issued in counterpart German Application No. 102017210864.9 dated Jul. 19, 2019 (five (5) pages).

\* cited by examiner

METHOD FOR PRODUCING A STEEL COMPONENT ASSEMBLY AND STEEL COMPONENT ASSEMBLY

CROSS REFERENCE TO RELATED APPLICATIONS

This application is a continuation of PCT International Application No. PCT/EP2018/062744, filed May 16, 2018, which claims priority under 35 U.S.C. § 119 from German Patent Application No. 10 2017 210 864.9, filed Jun. 28, 2017, the entire disclosures of which are herein expressly incorporated by reference.

BACKGROUND AND SUMMARY OF THE INVENTION

The invention relates to a method for producing a steel component assembly and to a steel component assembly.

A press-hardened steel-sheet component having at least one predetermined breaking point is known from WO 2016/096470 A1. The predetermined breaking point is a super-hardened component region which is provided for absorbing energy by breaking in the event of a crash load. On account thereof, the collision energy can be diverted in a targeted manner into other components. The press-hardened steel-sheet component herein can be joined together with further components in a component assembly.

It is an object of the present invention to provide a method for producing a steel component assembly, as well as a steel component assembly so produced, which is producible in a particularly simple and particularly rapid manner.

This object is achieved according to the invention by a method for producing a steel component assembly, as well as by a steel component assembly, as claimed herein.

In order to achieve a method for producing a steel component assembly by which the steel component assembly is producible in a particularly simple and particularly rapid manner, a steel component is provided with a predetermined breaking point. The predetermined breaking point of the steel component is punched through by way of a press-fit element so as to form an opening. The press-fit element is subsequently pressed into the opening of the steel component and a component that overlaps at least with the press-fit element is adhesively bonded to the steel component by use of an adhesive that is applied in a planar manner. Thereafter, a friction-drilling hole is melted through the press-fit element, the steel component, and the component, by way of a friction-drilling element.

In other words, this steel component, which is in particular a press-hardened steel component for a motor vehicle, is provided with the predetermined breaking point during a production process of the press-hardened steel component. The press-fit element is subsequently offered up to the predetermined breaking point of the steel component in such a manner that pressure can be exerted on the predetermined breaking point by means of the press-fit element and the predetermined breaking point on account thereof is punched so as to form the opening. The press-fit element is pressed into the opening of the steel component on account of pressure being exerted in a manner perpendicular to a plane of extent of the steel component on the press-fit element at least on one side, such that the opening is in particular filled with the press-fit element. The adhesive is subsequently applied in a planar manner to the steel component and/or the component, in particular in a region of the press-fit element, and the steel component is disposed so as to bear on the component. The steel component herein, at least in the region in which the press-fit element is disposed, is present so as to overlap the component. By means of the friction-drilling element, which can in particular be a friction-drilling screw, the friction-drilling hole under the effect of pressure and/or friction is melted through the press-fit element, the steel component, and the component. The friction-drilling hole is in particular melted in the opening through the steel component. For example, the friction-drilling element is disposed in the friction-drilling hole. On account of the press-fit element it can be prevented that the adhesive contaminates the friction-drilling hole by virtue of heat generated in the melting of the friction-drilling hole, since the press-fit element seals the friction-drilling hole when melting the friction-drilling hole. By virtue of the predetermined breaking point of the steel component, the opening can be directly punched into the steel component by way of the press-fit element such that no additional process step for incorporating the opening in the steel component such as, for example, laser cutting or punching, is required prior to incorporating the press-fit element.

In this context, it has been demonstrated to be advantageous when the steel component is provided with the predetermined breaking point during hardening. This means that the predetermined breaking point is incorporated in the steel component during a hardening procedure of the press-hardened steel component. During the hardening procedure of the press-hardened steel the latter is soft and malleable such that the predetermined breaking point can be incorporated in the steel component with particularly little complexity.

In one advantageous embodiment of the invention, it is provided that the friction-drilling hole is established by way of the friction-drilling element during a curing procedure of the adhesive. This means that the friction-drilling hole is melted through the press-fit element, the steel component, and the component when the adhesive, after the application thereof, is still present in a free-flowing state. The steel component and the component can be held firmly together by means of the friction-drilling hole in which the friction-drilling screw is disposed, for example, such that the adhesive during the curing fixes the steel component and the component in a state fixed by the friction-drilling hole and the friction-drilling screw.

In one further advantageous embodiment of the invention, it is provided that an aluminum frame as the component is adhesively bonded to the steel component so as to overlap the press-fit element. The aluminum frame can be an aluminum base frame of the motor vehicle, for example. The aluminum frame can be fastened to the steel component in a particularly strong and particularly positionally accurate manner by way of the method.

In one advantageous embodiment of the invention, it is provided that the predetermined breaking point is generated by incorporating a perforation in the steel component. This means that the steel component is provided with holes that form the perforation, said holes delimiting a defined region of the steel component such that said defined region as the predetermined breaking point can be particularly easily punched by the press-fit element. The incorporation of the perforation can be performed during the hardening of the steel component, for example. The perforation can be particularly easily incorporated in the steel component during the hardening, since the steel component during the hardening is present in a particularly soft state.

In one alternative advantageous embodiment of the invention, it is provided that the predetermined breaking point is generated by way of a local material narrowing of the steel component by use of a forming element. For example, the forming element has a convexity which during a forming process or during a hardening process of the steel component causes at least in regions a material narrowing of the steel component in the defined region. For example, the forming element can be applied to the steel component by way of pressure such that material in the defined region is displaced in order for the local material narrowing to be generated by the concavity of the forming element. When the local material narrowing is generated during a production process of the press-hardened steel component, a method step for generating the opening can thus be saved in that the predetermined breaking point is punched so as to form the opening simultaneously with incorporating the press-fit element. Time can advantageously be saved on account thereof.

Alternatively, the predetermined breaking point can be generated by local overheating in the defined region during a hardening process of the press-hardened steel component.

A further aspect of the invention relates to a steel component assembly, having a steel component which has an opening that is generated by a press-fit element punching a predetermined breaking point. The steel component assembly moreover comprises the press-fit element which is pressed into the opening of the steel component. The steel component assembly moreover has a component which by means of an adhesive is fastened to the steel component so as to overlap at least the opening, wherein the steel component assembly has a friction-drilling opening which extends through the overlapping press-fit element, steel component, and component. Individual components of the steel component assembly are advantageously connected to one another in a particularly strong manner since the steel component as well as the component are connected to one another by way of an adhesive connection as well as by way of a friction-drilling hole connection.

To this end, it is provided in one advantageous refinement of the invention that a friction-drilling screw by means of which the friction-drilling opening has been generated is disposed in the friction-drilling opening. This means that the friction-drilling hole in the opening by means of the friction-drilling screw has been melted through the press-fit element, the steel component, and the component, and the friction-drilling screw remains disposed in the friction-drilling hole. On account thereof, the steel component and the component which can be an aluminum base frame of a motor vehicle are connected to one another in a particularly strong manner. This herein is thus a particularly stable steel component assembly.

Other objects, advantages and novel features of the present invention will become apparent from the following detailed description of one or more preferred embodiments when considered in conjunction with the accompanying drawings.

DETAILED DESCRIPTION OF THE DRAWINGS

A method for producing a steel component assembly 1 is illustrated in a schematic sectional view when viewing FIGS. 1 to 8 in combination. A steel component 2 having a predetermined breaking point 3 is shown in a schematic sectional view in FIG. 1. The predetermined breaking point 3 is generated by way of a local material narrowing 4 in a defined region of the steel component 2. The steel component 2 presently is a press-hardened steel component for a motor vehicle. The steel component 2 presently is provided with the predetermined breaking point 3 during hardening. Alternatively, the predetermined breaking point 3 can be generated by way of a perforation of the steel component 2.

Figure 1:
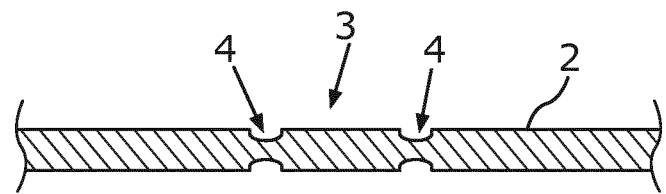
FIG. 1 shows a schematic sectional view of a steel component having a predetermined breaking point.
Figure 2:
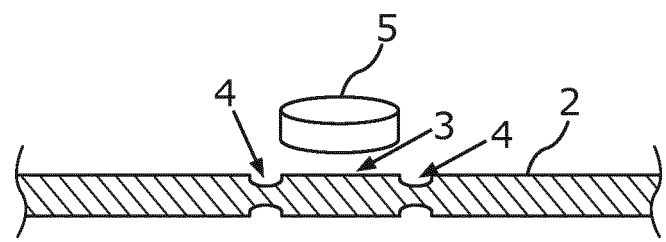
FIG. 2 shows a schematic sectional view of the steel component according to FIG. 1 having the predetermined breaking point, as well as a press-fit element which is disposed so as to be spaced apart from the steel component.
Figure 3:
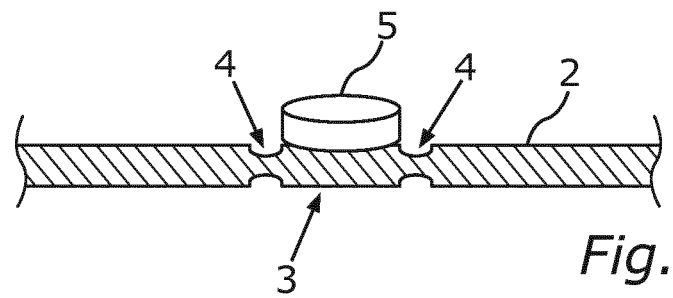
FIG. 3 shows a schematic sectional view of the steel component according to FIG. 1 having the predetermined breaking point and the press-fit element which bears on the steel component.
Figure 4:
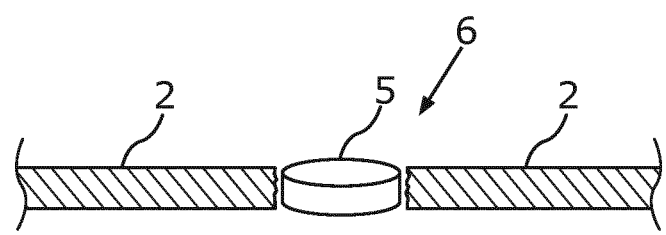
FIG. 4 shows a schematic sectional view of the steel component having the press-fit element which is disposed in an opening of the steel component.
Figure 5:
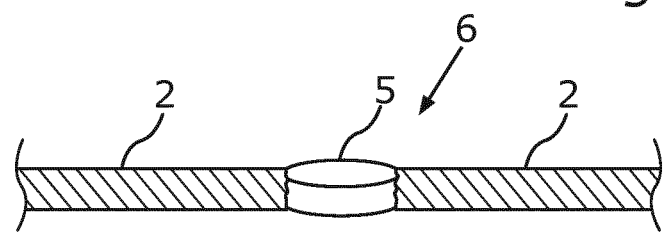
FIG. 5 shows a schematic sectional view of the steel component having the press-fit element which is pressed into the opening of the steel component.
Figure 6:
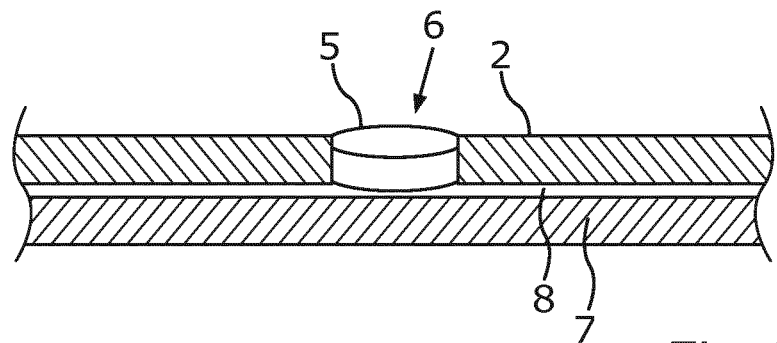
FIG. 6 shows a schematic sectional view of the steel component having the pressed-in press-fit element according to FIG. 5, and a component being adhesively bonded thereto by way of an adhesive.

It is illustrated in a schematic sectional view in FIG. 2 how a press-fit element 5 is disposed in the region of the predetermined breaking point 3 so as to be spaced apart from the steel component 2. It can be seen in a schematic sectional view of the steel component 2 illustrated in FIG. 3 how the press-fit element 5 is disposed on the predetermined breaking point 3 on the steel component 2. The predetermined breaking point 3 of the steel component 2, by impingement with a force by means of the press-fit element 5, is punched so as to form an opening 6. As is illustrated in FIG. 4, the press-fit element 5, after the punching of the predetermined breaking point 3 of the steel component 2, is disposed in the opening 6 of the steel component 2. By further impinging the press-fit element 5 with a force, the press-fit element 5 is pressed into the opening 6 of the steel component 2, as is illustrated in a schematic sectional view in FIG. 5, such that the press-fit element 5 completely fills the opening 6.

After pressing the press-fit element 5 into the opening 6 of the steel component 2, a component 7 that overlaps at least with the press-fit element 5 is adhesively bonded to the steel component 2 by way of an adhesive 8 that is applied in a planar manner. The component 7 presently is an aluminum base frame of the motor vehicle. The adhesive 8 can be applied in a planar manner to the component 7 and/or to the steel component 2. During a curing procedure of the adhesive 8, a friction-drilling hole 9 is melted through the press-fit element 5, the steel component 2, and the component 7, by means of a friction-drilling element, in particular a friction-drilling screw 10. The melting is performed by virtue of friction and an increase in temperature resulting therefrom in the region about the friction-drilling screw 10.

Figure 7:
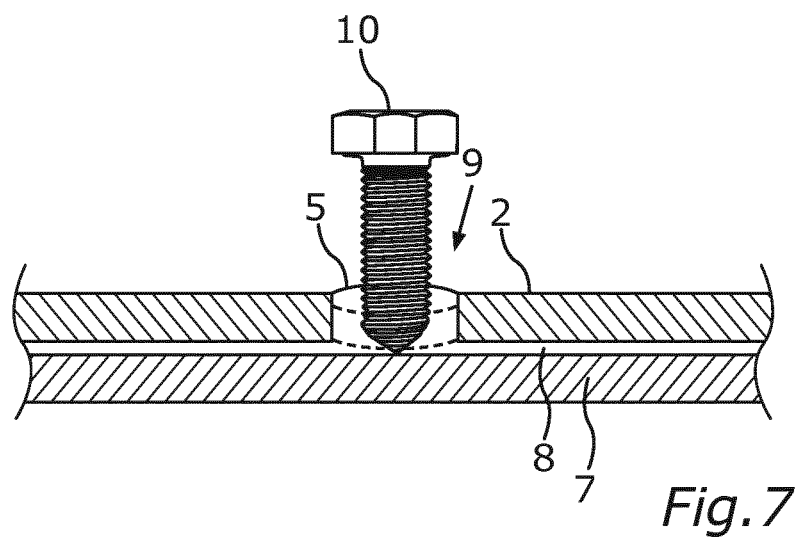
FIG. 7 shows a schematic sectional view of the steel component having the press-fit element disposed in the opening, the component being adhesively bonded thereto by the adhesive, and a friction-drilling screw, wherein a friction-drilling hole has been melted through the press-fit element by way of the friction-drilling screw.
Figure 8:
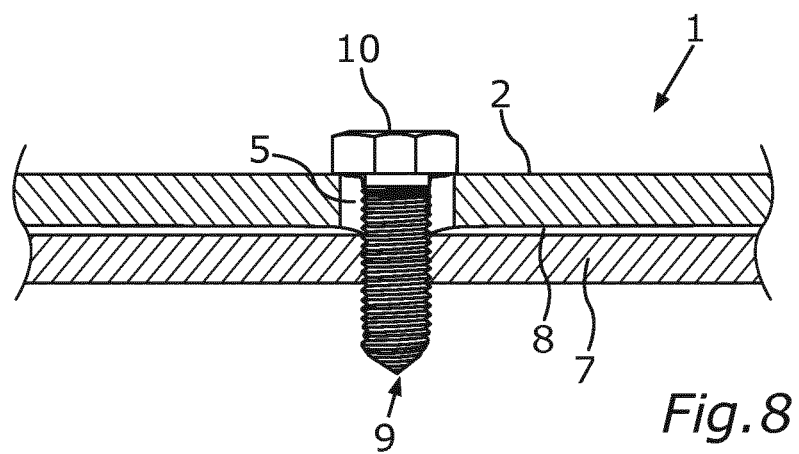
FIG. 8 shows a schematic sectional view of the steel component having the press-fit element disposed in the opening and the component adhesively bonded by the adhesive, as well as having the friction-drilling screw by which a friction-drilling hole has been melted through the press-fit element, the steel component, and the component.

As is illustrated in FIG. 7, the friction-drilling screw 10 for generating the friction-drilling hole 9 is placed on the press-fit element 5 and is first moved through the latter. The friction-drilling hole 9 is subsequently melted through the adhesive 8 and the component 7. As can be seen in a schematic sectional view in FIG. 8, the press-fit element 5 melts as a result of a generation of heat when generating the friction-drilling hole 9 and on account thereof changes its shape. It is illustrated in FIG. 8 how the press-fit element 5 melts into a layer formed by the adhesive 8 and thus shields or seals, respectively, the adhesive 8 in relation to the friction-drilling screw 10. After the friction-drilling hole 9 has been generated, the friction-drilling screw 10 can continue to be disposed in the friction-drilling hole 9, or can be removed from the friction-drilling hole 9 after the adhesive 8 and the press-fit element 5 that has melted as a result of the heat generation have solidified.

The method described in the context of FIGS. 1 to 8 herein is based on the concept that it is currently not possible to join press-hardened steel components by means of the friction-drilling screw 10 and an adhesive layer lying therebetween without the adhesive 8, on account of the heat generation close to the friction-drilling screw 10, contaminating the region about the friction-drilling hole 9 on the press-hardened steel component 2, or on the component 7, respectively. A remedy is achieved by way of the press-fit element 5 in that the latter seals said region. The press-fit element 5 should have a strength that is relatively minor in comparison to the press-hardened steel component 2, this leading to an incorporation of the press-fit element 5 into the steel component 2 is currently not possible without a through bore. It is problematic that the press-fit element 5 is softer than the steel component 2 but is intended to penetrate the latter. Since a penetration, or punching, respectively, of the steel component 2 by means of the press-fit element 5 that is softer in comparison to the steel component 2 is currently not possible without a through bore, an additional process step which is associated with additional costs is required.

In order for said additional process step to be avoided, the steel component assembly 1 is produced by the method as described in the context of FIGS. 1 to 8. In a manner similar to a closure of a beverage can or a SIM card, the predetermined breaking point 3 in the form of the opening 6 to be generated later is to be incorporated during the production process of the steel component 2. Said predetermined breaking point 3 as a trench-shaped depression in the steel component 2 is created on account of a contour on a tool half which in a production process of the press-hardened steel component 2 is pushed into a material of the steel component 2. This pushing requires only little force since the steel component 2 on account of being heated in the production process is present so as to be almost doughy. No chip or waste which would have to be discharged is created herein.

The additional process step which would be, for example, laser cutting or punching prior to incorporating the press-fit element 5, can thus advantageously be saved.

LIST OF REFERENCE SIGNS

1 Steel component assembly
2 Steel component
3 Predetermined breaking point
4 Material narrowing
5 Press-fit element
6 Opening
7 Component
8 Adhesive
9 Friction-drilling hole
10 Friction-drilling screw The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for producing a steel component assembly, comprising:
    providing a steel component with a predetermined breaking point;
    punching the predetermined breaking point of the steel component by way of a press-fit element so as to form an opening;
    pressing the press-fit element into the opening of the steel component;
    adhesively bonding a component that overlaps at least with the press-fit element to the steel component by use of an adhesive that is applied in a planar manner; and
    melting a friction-drilling hole through the press-fit element, the steel component, and the component, by way of a friction-drilling element.
2. The method according to claim 1, wherein
    the steel component is provided with the predetermined breaking point during hardening.
3. The method according to claim 1, wherein
    the friction-drilling hole is established by the friction-drilling element during a curing procedure of the adhesive.
4. The method according to claim 1, wherein
    an aluminum frame as the component is adhesively bonded to the steel component so as to overlap the press-fit element.
5. The method according to claim 1, wherein
    the predetermined breaking point is generated by incorporating a perforation in the steel component.
6. The method according to claim 1, wherein
    the predetermined breaking point is generated by way of a local material narrowing of the steel component by a forming element.

* * * * *